(12) United States Patent
Agace (10) Patent No.: US 9,442,037 B2
(45) Date of Patent: Sep. 13, 2016

(54) SYSTEM AND METHOD FOR STORING AND LEAK TESTING A RADIOACTIVE MATERIALS STORAGE CANISTER

(71) Applicant: Holtec International, Inc., Marlton, NJ (US)

(72) Inventor: Stephen J. Agace, Voorhees, NJ (US)

(73) Assignee: HOLTEC INTERNATIONAL

( * ) Notice: Subject to any disclaimer, the term of this patent is extended or adjusted under 35 U.S.C. 154(b) by 0 days.

(21) Appl. No.: 14/424,201

(22) PCT Filed: Sep. 3, 2013

(86) PCT No.: PCT/US2013/057855
§ 371 (c)(1),
(2) Date: Feb. 26, 2015

(87) PCT Pub. No.: WO2014/036561
PCT Pub. Date: Mar. 6, 2014

(65) Prior Publication Data
US 2015/0211954 A1   Jul. 30, 2015

Related U.S. Application Data (60) Provisional application No. 61/695,837, filed on Aug. 31, 2012.

(51) Int. Cl.
| | | |
|---|---|---|
| *G21F 5/00* | (2006.01) | |
| *G01M 3/04* | (2006.01) | |
| *G01M 3/20* | (2006.01) | |
| *G21F 5/002* | (2006.01) | |
| *G21F 5/005* | (2006.01) | |
| *G21F 5/12* | (2006.01) | |
| *G01M 3/22* | (2006.01) | |

(52) U.S. Cl.
CPC ............. *G01M 3/202* (2013.01); *G01M 3/223* (2013.01); *G01M 3/229* (2013.01); *G21F 5/002* (2013.01); *G21F 5/005* (2013.01); *G21F 5/12* (2013.01); *G21F 2005/125* (2013.01)

(58) Field of Classification Search
USPC ................................ 250/505.1, 506.1, 507.1
See application file for complete search history.

(56) References Cited

U.S. PATENT DOCUMENTS

| | | |
|---|---|---|
| 2,432,929 A | 12/1947 | Parrish |
| 2,486,199 A | 10/1949 | Nier |
| 6,114,710 A | 9/2000 | Contrepois et al. |

OTHER PUBLICATIONS

Corresponding International Search Report for PCT/US2013/057855 dated Mar. 21, 2014.

*Primary Examiner* — Nicole Ippolito
*Assistant Examiner* — Hanway Chang
(74) *Attorney, Agent, or Firm* — The Belles Group, P.C.

(57) ABSTRACT

A system for storing radioactive materials includes a canister having a first hermetically sealed vessel having a first cavity, a second hermetically sealed vessel having a second cavity, the first vessel positioned in the second cavity, an interstitial space between the first and second vessels, and a test port through the second vessel in fluidic communication with the interstitial space. A conduit has a first end fluidically coupled to the test port, and a removable seal is operably coupled to a second end of the conduit.

27 Claims, 13 Drawing Sheets

SYSTEM AND METHOD FOR STORING AND LEAK TESTING A RADIOACTIVE MATERIALS STORAGE CANISTER

CROSS REFERENCE TO RELATED APPLICATIONS

Priority is claimed as a national stage application, under 35 U.S.C. §371, to international application No. PCT/US2013/057855, filed Sep. 31, 2013,which claims priority to U.S. Provisional Application No. 61/695,837, filed Aug. 31, 2012. The disclosures of the aforementioned priority applications are incorpoated herein by reference in their entireties.

FIELD OF THE INVENTION

The field of the present invention relates to systems and methods for storing radioactive materials.

BACKGROUND OF THE INVENTION

Periodic leak testing is often required for monitoring the integrity of the inner and outer confinement boundaries on canisters holding radioactive materials. Some present leak testing processes involve removing the cask lid, which is undesirable, as doing so has the potential to increase radiation exposure to workers. Other leak testing processes and systems involve installing a continuous leak testing monitoring system that uses a compressed helium tank and pressure transducers. Such a system, however, requires periodic replacement of the transducers and replenishment of the helium gas stored in the tank.

In view of the shortcomings of present leak detection processes and systems, improvements are desirable which reduce the on-site maintenance requirements, improve leak detection capabilities, and reduce potential radiation exposure to workers.

SUMMARY OF THE INVENTION

The present invention is directed toward a system and method for leak testing a canister used for storing radioactive materials. The canister is a dual walled containment vessel, and the system and method allow testing the containment boundaries established by each of the dual walls while the canister remains in its storage position and with all additional containment systems in place.

In a first separate aspect of the present invention, a system for storing radioactive materials includes a canister with a first hermetically sealed vessel having a first cavity, a second hermetically sealed vessel having a second cavity, the first vessel being positioned in the second cavity, an interstitial space between the first and second vessels, and a test port through the second vessel in fluidic communication with the interstitial space. A conduit has a first end fluidically coupled to the test port, and a removable seal is operably coupled to a second end of the conduit.

In a second separate aspect of the present invention, a method of storing radioactive materials includes positioning a canister loaded with the radioactive materials in the cavity of a cask, the cavity being formed by a cask body with an open top end. The canister includes a first hermetically sealed vessel having a first cavity in which the radioactive materials are disposed and a second hermetically sealed vessel having a second cavity. The first vessel is positioned in the second cavity, such that an interstitial space exists between the first and second vessels, and the second vessel includes a test port that is in fluidic communication with the interstitial space. The first end of a conduit is fluidically coupled to the test port, with the conduit extending from the first end to a second end located outside of the cask. A cask lid is secured to the cask body to substantially enclose the open top end of the cask cavity.

In a third separate aspect of the present invention, a system for leak testing a canister containing radioactive materials includes a canister with a first hermetically sealed vessel having a first cavity, a second hermetically sealed vessel having a second cavity, wherein the first vessel is positioned in the second cavity, an interstitial space between the first and second vessels, and a test port through the second vessel in fluidic communication with the interstitial space. A conduit has a first end fluidically coupled to the test port, and a removable seal is operably coupled to the second end of the conduit. A leak detector is configured to operably couple to the second end of the conduit and to detect whether a leak exists in at least one of the first vessel and the second vessel.

In a fourth separate aspect of the present invention, a method of leak testing a storage canister for radioactive materials includes positioning the canister in a cask cavity of a cask body. The canister has a first hermetically sealed vessel having a first cavity in which the radioactive materials are disposed and a second hermetically sealed vessel having a second cavity. The first vessel is positioned in the second cavity such that an interstitial space exists between the first and second vessels, and the second vessel includes a test port that is in fluidic communication with the interstitial space. The first end of a conduit is coupled to the test port, with the conduit extending from the first end to a second end located outside of the cask body. A cask lid is secured to the cask body to substantially enclose the cask cavity. A leak detector is operatively coupled to the second end of the conduit to perform a leak test comprising determining whether a leak exists in at least one of the first vessel and the second vessel In a fifth separate aspect of the present invention, a method of leak testing a canister containing radioactive materials includes coupling a first end of a conduit to a test port of the canister, such that the conduit is in fluid communication with an interstitial space of the canister. A leak detector is operatively coupled to the second end of the conduit, and gas is drawn from the conduit using the leak detector to establish a vacuum within the conduit and the interstitial space. The drawn gas is monitored for the presence of a first indicator which is representative of a leak in a fluidic containment boundary of the canister that contains the radioactive materials.

In a sixth separate aspect of the present invention, any of the foregoing aspects may be employed in combination.

Accordingly, an improved system and method for leak testing a double walled radioactive materials canister are disclosed. Advantages of the improvements will be apparent from the drawings and the description of the preferred embodiment.

BRIEF DESCRIPTION OF THE DRAWINGS

The foregoing summary, as well as the following detailed description of the exemplary embodiments, will be better understood when read in conjunction with the appended drawings. It should be understood, however, that the invention is not limited to the precise arrangements and instrumentalities shown in the following figures.

DETAILED DESCRIPTION OF THE INVENTION

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "left," "right," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the preferred embodiments. Accordingly, the invention expressly should not be limited to such preferred embodiments illustrating some possible non-limiting combinations of features that may exist alone or in other combinations of features; the scope of the invention being defined by the claims appended hereto.

Figure 1:
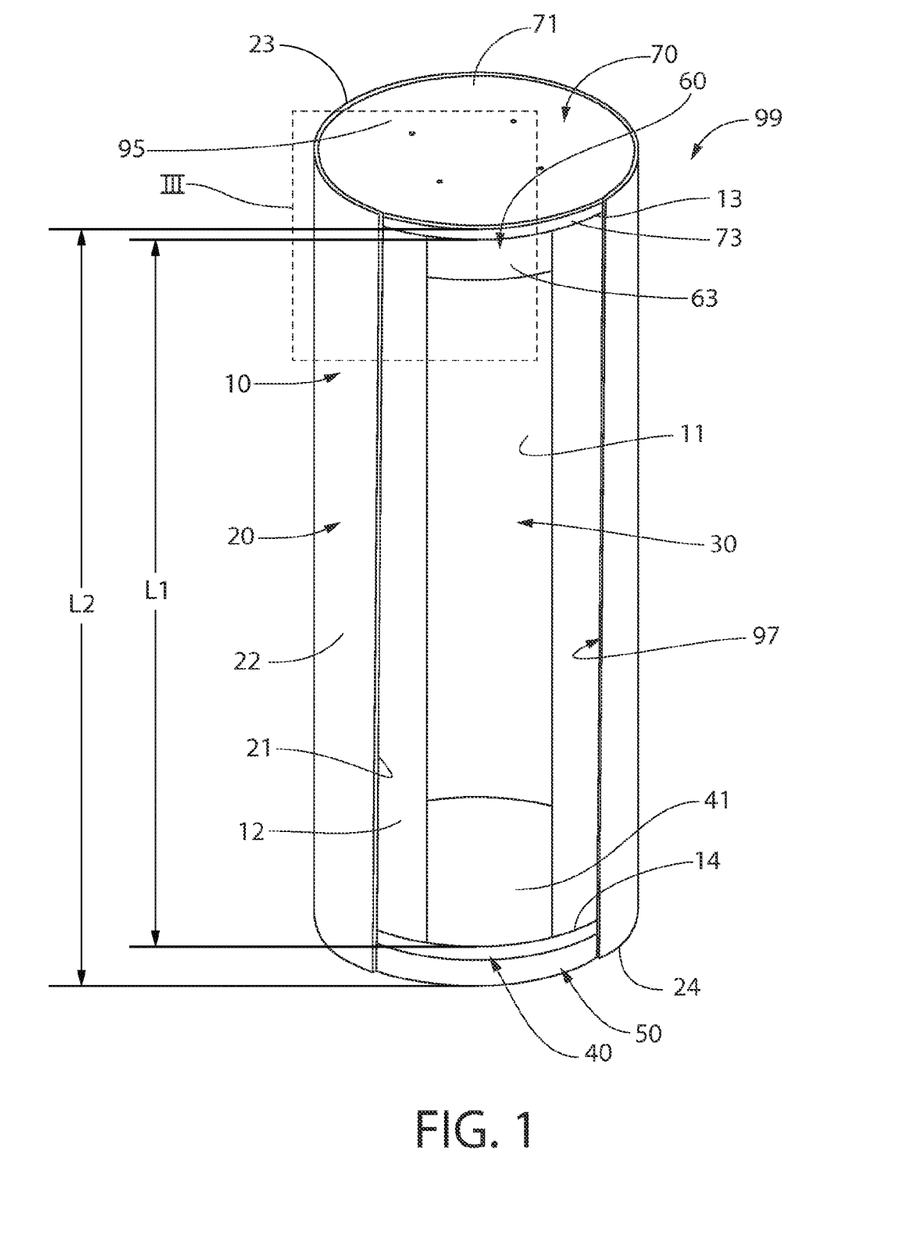
FIG. 1 is a top perspective view of a dual-walled DSC having a section cut-away.

Referring to FIG. 1, a dual-walled DSC 99 according to one embodiment of the present invention is disclosed. The dual-walled DSC 99 and its components are illustrated and described as an MPC style structure. However, it is to be understood that the concepts and ideas disclosed herein can be applied to other areas of high level radioactive waste storage, transportation and support. Moreover, while the dual-walled DSC 99 is described as being used in combination with a specially designed fuel basket 90 (which in of itself constitutes an invention), the dual-walled DSC 99 can be used with any style of fuel basket, such as the one described in U.S. Pat. No. 5,898,747, issued Apr. 27, 1999. In fact, in some instances it may be possible to use the dual-walled DSC 99 without a fuel basket, depending on the intended function. Furthermore, the dual-walled DSC 99 can be used to store and/or transport any type of high level radioactive materials and is not limited to SNF.

As will become apparent from the structural description below, the dual-walled DSC 99 contains two independent containment boundaries about the storage cavity 30 that operate to contain both fluidic (gas and liquid) and particulate radiological matter within the cavity 30. As a result, if one containment boundary were to fail, the other containment boundary will remain intact. While theoretically the same, the containment boundaries formed by the dual-walled DSC 99 about the cavity 30 can be literalized in many ways, including without limitation a gas-tight containment boundary, a pressure vessel, a hermetic containment boundary, a radiological containment boundary, and a containment boundary for fluidic and particulate matter. These terms are used synonymously throughout this application. In one instance, these terms generally refer to a type of boundary that surrounds a space and prohibits all fluidic and particulate matter from escaping from and/or entering into the space when subjected to the required operating conditions, such as pressures, temperatures, etc.

Finally, while the dual-walled DSC 99 is illustrated and described in a vertical orientation, it is to be understood that the dual-walled DSC 99 can be used to store and/or transport its load in any desired orientation, including at an angle or horizontally. Thus, use of all relative terms through this specification, including without limitation "top," "bottom," "inner" and "outer," are used for convenience only and are not intended to be limiting of the invention in such a manner.

The dual-walled DSC 99 includes a first shell that acts as an inner shell 10 and a second shell that acts as an outer shell 20. The inner and outer shells 10, 20 are preferably cylindrical tubes and are constructed of a metal. Of course, other shapes can be used if desired. The inner shell 10 is a tubular hollow shell that includes an inner surface 11, an outer surface 12, a top edge 13 and a bottom edge 14. The inner surface 11 of the inner shell 10 forms a cavity/space 30 for receiving and storing SNF. The cavity 30 is a cylindrical cavity formed about a central axis.

The outer shell 20 is also a tubular hollow shell that includes an inner surface 21, an outer surface 22, a top edge 23 and a bottom edge 24. The outer shell 20 circumferentially surrounds the inner shell 10. The inner shell 10 and the outer shell 20 are constructed so that the inner surface 21 of the outer shell 20 is in substantially continuous surface contact with the outer surface 12 of the inner shell 10. In other words, the interface between the inner shell 10 and the outer shell 20 is substantially free of gaps/voids and are in conformal contact. This can be achieved through an explosive joining, a cladding process, a roller bonding process and/or a mechanical compression process that bonds the inner shell 10 to the outer shell 20. The continuous surface contact at the interface between the inner shell 10 and the outer shell 20 reduces the resistance to the transmission of heat through the inner and outer shells 10, 20 to a negligible value. Thus, heat emanating from the SNF loaded within the cavity 30 can efficiently and effectively be conducted outward through the shells 10, 20 where it is removed from the outer surface 22 of the outer shell via convection.

Even though the interface is formed in any of these manners, there still remains an interstitial space 97 between the inner shell 10 and the outer shell 20. Alternatively, the interstitial space may be formed without the inner surface of the outer shell being in substantially continuous surface contact with the outer surface of the inner shell. As is discussed in more detail below, the presence of this interstitial space is used advantageously during a leak testing process.

The inner and outer shells 10, 20 are preferably both made of a metal. As used herein, the term metal refers to both pure metals and metal alloys. Suitable metals include without limitation austenitic stainless steel and other alloys including Hastelloy™ and Inconel™. Of course, other materials can be utilized. The thickness of each of the inner and outer shells 10, 20 is preferably in the range of 5 mm to 25 mm. The outer diameter of the outer shell 20 is preferably in the range of 1700 mm to 2000 mm. The inner diameter of the inner shell 10 is preferably in the range of 1700 mm to 1900 mm. The specific size and/or thickness of the shells 10, 20, however, is a matter of design choice.

In some embodiments, it may be further preferable that the inner shell 10 be constructed of a metal that has a coefficient of thermal expansion that is equal to or greater than the coefficient of thermal expansion of the metal of which the outer shell 20 is constructed. Thus, when the SNF that is stored in the cavity 30 and emits heat, the outer shell 20 will not expand away from the inner shell 10. This ensures that the continuous surface contact between the outer surface 12 of the inner shell 10 and the outer surface 21 of the outer shell 20 will be maintained and a gaps will not form under heat loading conditions.

The dual-walled DSC 99 also includes a first lid that acts as an inner top lid 60 for the inner shell 10 and a second lid that acts as an outer top lid 70 for the second shell 20. The inner and outer top lids 60, 70 are plate-like structures that are preferably constructed of the same materials discussed above with respect to the shells 10, 20. Preferably the thickness of the inner top lid 60 is in the range of 99 mm to 300 mm. The thickness of the outer top lid is preferably in the range of 50 mm to 150 mm. The invention is not, however, limited to any specific dimensions, which will be dictated on a case-by-case basis and the radioactive levels of the SNF to be stored in the cavity 30.

Figure 2:
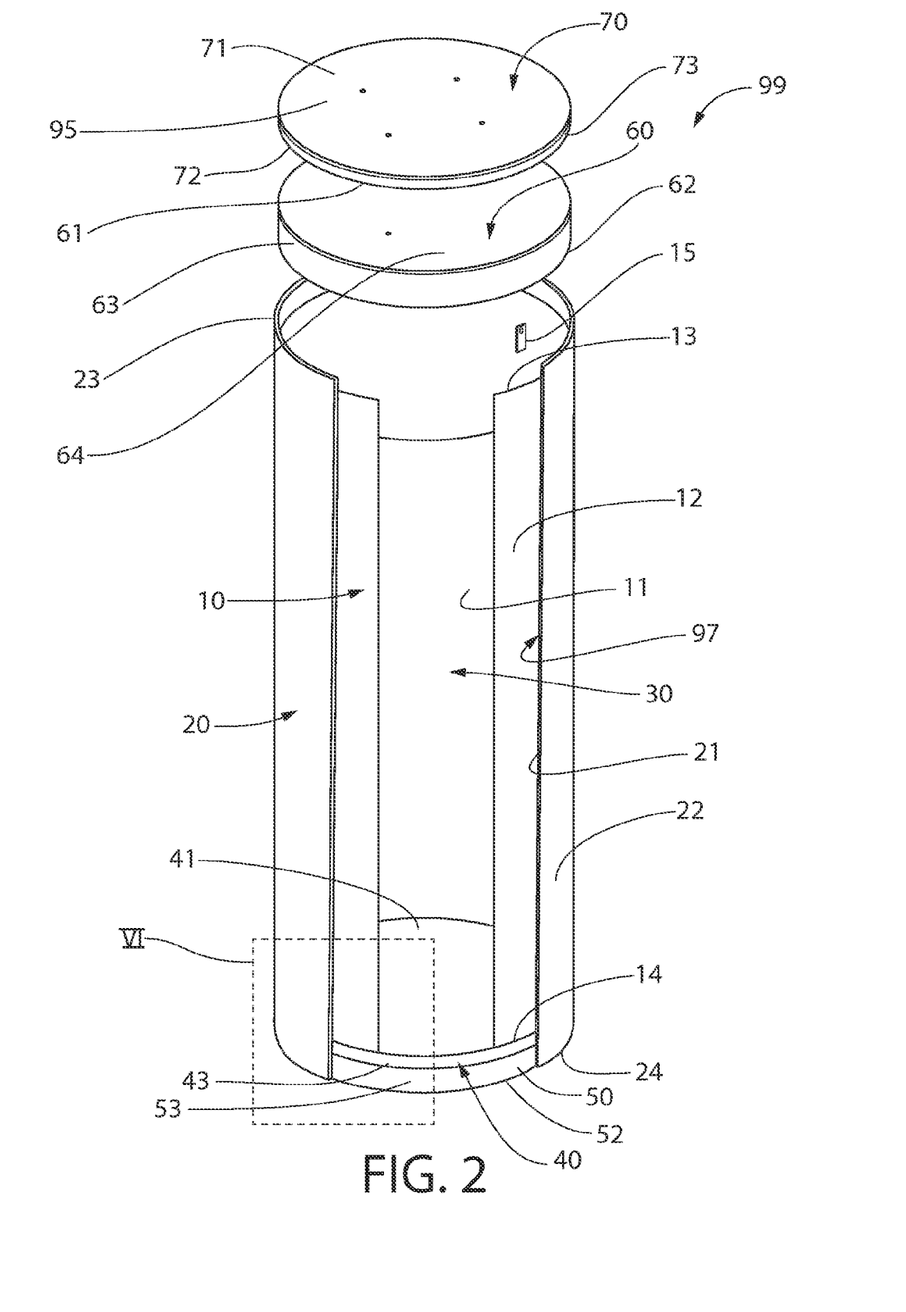
FIG. 2 is an exploded view of the dual-walled DSC of FIG. 1 showing the inner and outer top lids removed from the inner and outer shells.

Referring to FIG. 2, the inner top lid 60 includes a top surface 61, a bottom surface 62 and an outer lateral surface/edge 63. The outer top lid 70 includes a top surface 71, a bottom surface 72 and an outer lateral surface/edge 73. When fully assembled, the outer lid 70 is positioned atop the inner lid 60 so that the bottom surface 72 of the outer lid 70 is in substantially continuous surface contact with the top surface 61 of the inner lid 60. The outer lid 70 also includes a test port 95, to which one end of conduit is coupled (see FIGS. 10 and 11) in fluidic communication therewith. As is discussed below, the other end of the conduit is fitted with both a removable seal, to enable leak testing, and valve, both being included to comply with ASME Code.

During an SNF underwater loading procedure, the inner and outer lids 60, 70 are removed. Once the cavity 30 is loaded with the SNF, the inner top lid 60 is positioned so as to enclose the top end of the cavity 30 and rests atop the brackets 15. Once the inner top lid 60 is in place and seal welded to the inner shell 10, the cavity 30 is evacuated/dried via the appropriate method and backfilled with nitrogen, helium or another inert gas. The drying and backfilling process of the cavity 30 is achieved via the holes 64 of the inner lid 60 that form passageways into the cavity 30. Once the drying and backfilling is complete, the holes 61 are filled with a metal or other wise plugged so as to hermetically seal the cavity 30.

Figure 3:
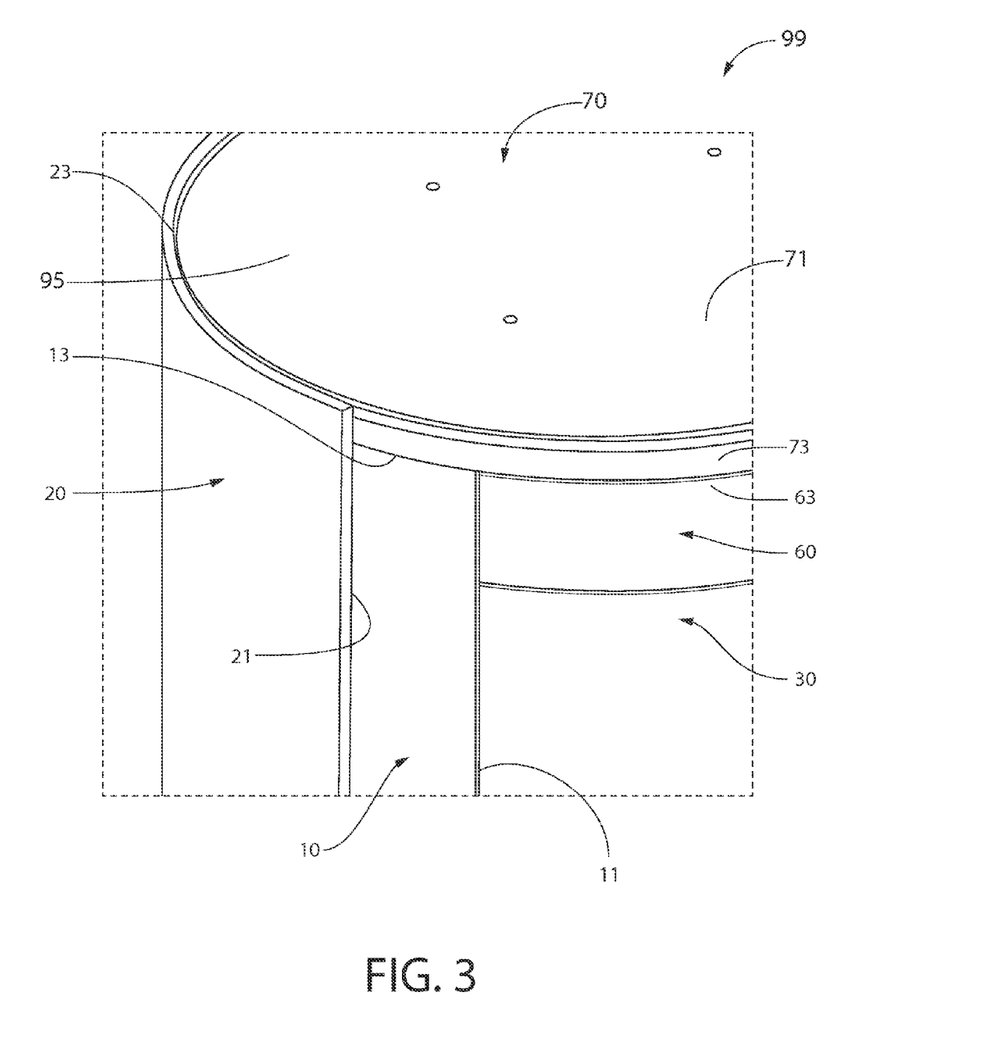
FIG. 3 is a close-up view of the area III-III of FIG. 1.

Referring now to FIGS. 1 and 3 concurrently, the outer shell 20 has an axial length $L_2$ that is greater than the axial length $L_1$ of the inner shell 10. As such, the top edge 13 of the inner shell 10 extends beyond the top edge 23 of the outer shell 20. Similarly, the bottom edge 24 of the outer shell 20 extends beyond the bottom edge 13 of the inner shell 10.

The offset between the top edges 13, 23 of the shells 10, 20 allows the top edge 13 of the inner shell 10 to act as a ledge for receiving and supporting the outer top lid 70. When the inner lid 60 is in place, the inner surface 11 of the inner shell 10 extends over the outer lateral edges 63. When the outer lid 70 is then positioned atop the inner lid 60, the inner surface 21 of the outer shell 20 extends over the outer lateral edge 73 of the outer top lid 70. The top edge 23 of the outer shell 20 is substantially flush with the top surface 71 of the outer top lid 70. The inner and outer top lids 60, 70 are welded to the inner and outer shells 10, 20 respectively after the fuel is loaded into the cavity 30. Conventional edge groove welds can be used. However, it is preferred that all connections between the components of the dual-walled DSC 99 be through-thickness weld.

The dual-walled DSC 99 also includes a first plate that acts as an inner base plate 40 and a second plate that acts as an outer base plate 50. The inner and outer base plates 40, 50 are rigid plate-like structures having circular horizontal cross-sections. The invention is not so limited, however, and the shape and size of the base plates 40, 50 is dependent upon the shape of the inner and outer shells 10, 20. The inner base plate 40 includes a top surface 41, a bottom surface 42 and an outer lateral surface/edge 43. Similarly, the outer base plate 50 includes a top surface 51, a bottom surface 52 and an outer lateral surface/edge 53.

The top surface 41 of the inner base plate 40 forms the floor of the cavity 30. The inner base plate 40 rests atop the outer base plate 50. Similar to the other corresponding components of the dual-walled DSC 99, the bottom surface 42 of the inner base plate 40 is in substantially continuous surface contact with the top surface 51 of the outer base plate 50. As a result, the interface between the inner base plate 40 and the outer base plate 50 is free of gaseous gaps/voids for thermal conduction optimization. An explosive joining, a cladding process, a roller bonding process and/or a mechanical compression process can be used to effectuate the contact between the base plates 40, 50. Preferably, the thickness of the inner base plate 40 is in the range of 50 mm to 150 mm. The thickness of the outer base plate 50 is preferably in the range of 99 mm to 200 mm. Preferably, the length from the top surface of the outer top lid 70 to the bottom surface of the outer base plate 50 is in the range of 4000 mm to 5000 mm, but the invention is in no way limited to any specific dimensions.

The outer base plate 50 may be equipped on its bottom surface with a grapple ring (not shown) for handling purposes. The thickness of the grapple ring is preferably between 50 mm and 150 mm. The outer diameter of the grapple ring is preferably between 350 mm and 450 mm.

Figure 4:
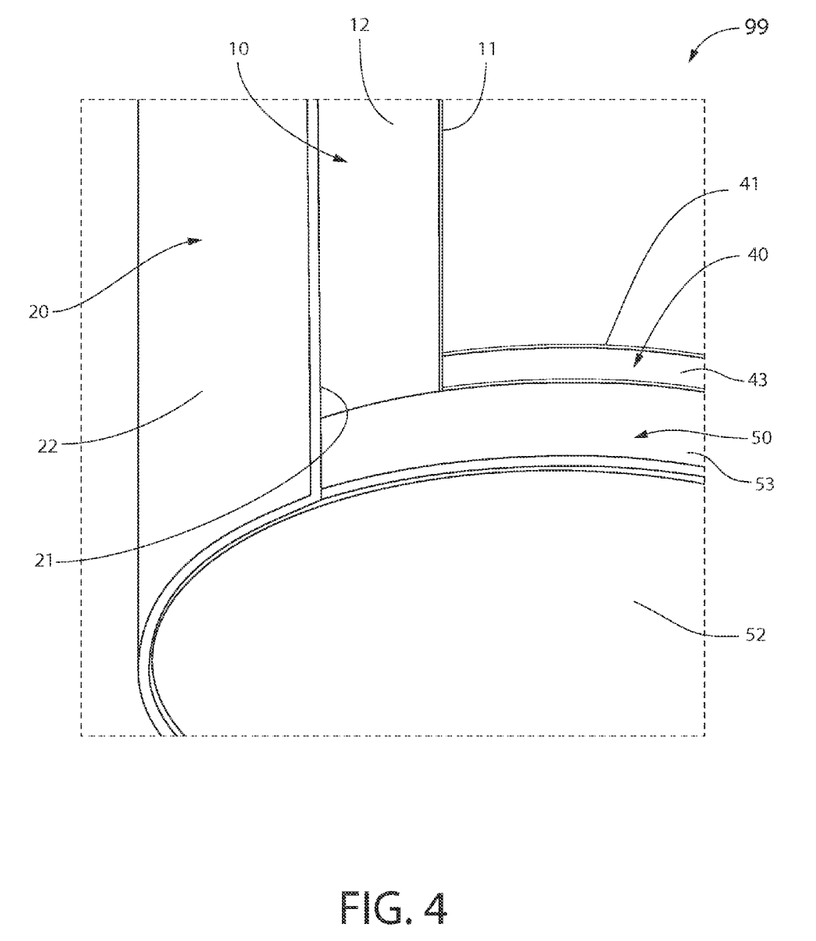
FIG. 4 is a close-up view of the area IV-IV of FIG. 2.

Referring now to FIGS. 2 and 4 concurrently, the inner shell 10 rests atop the inner base plate 40 in a substantially upright orientation. The bottom edge 14 of the inner shell 10 is connected to the top surface 41 of the inner base plate 40 by a through-thickness single groove (V or J shape) weld. The outer surface 12 of the inner shell 10 is substantially flush with the outer lateral edge 43 of the inner base plate 40.

The outer shell 20, which circumferentially surrounds the inner shell 10, extends over the outer lateral edges 43, 53 of the inner and outer base plates 40, 50 so that the bottom edge 24 of the outer shell 20 is substantially flush with the bottom surface 52 of the outer base plate 50. The inner surface 21 of the outer shell 20 is also connected to the outer base plate 50 using a through-thickness edge weld. In an alternative embodiment, the bottom edge 24 of the outer shell 20 could rest atop the top surface 51 of the outer base plate 50 (rather than extending over the outer later edge of the base plate 50). In that embodiment, the bottom edge 24 of the outer shell 20 could be welded to the top surface 51 of the outer base plate 50.

When all of the seal welds discussed above are completed, the combination of the inner shell 10, the inner base plate 40 and the inner top lid 60 forms a first hermetically sealed structure surrounding the cavity 30, thereby creating a first pressure vessel. Similarly, the combination of the outer shell 20, the outer base plate 50, and the outer top lid 70 form a second sealed structure about the first hermetically sealed structure, thereby creating a second pressure vessel about the first pressure vessel and the cavity 30. With the inclusion of the test port 95, the seal of the second pressure vessel also effectively includes the conduit, sealed at the end not coupled to the test port. Theoretically, the first pressure vessel is located within the internal cavity of the second pressure vessel. Each pressure vessel is engineered to autonomously meet the stress limits of the ASME Code with significant margins.

Unlike the prior art DSC, all of the SNF stored in the cavity 30 of the dual-walled DSC 99 share a common confinement space. The common confinement space (i.e., cavity 30) is protected by two independent gas-tight pressure retention boundaries. Each of these boundaries can withstand both sub-atmospheric supra-atmospheric pressures as needed, even when subjected to the thermal load given off by the SNF within the cavity 30.

In the event the of a failure of the first hermetically sealed structure surrounding the cavity 30, at least some of the backfilled helium will leak into the interstitial space 97. Because helium is both an inert gas and a small molecule, the testing equipment and processes, described in greater below, are able to draw helium through the interstitial space 97 for detection and determination of whether the first hermetically sealed structure has failed.

Figure 5A:
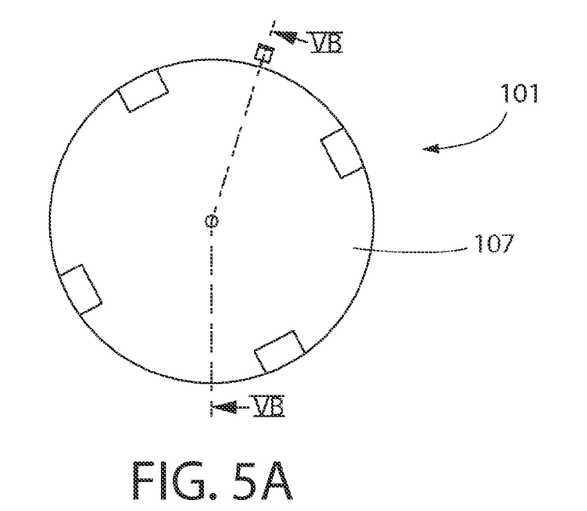
FIG. 5A is a top view of a ventilated storage system.
Figure 5B:
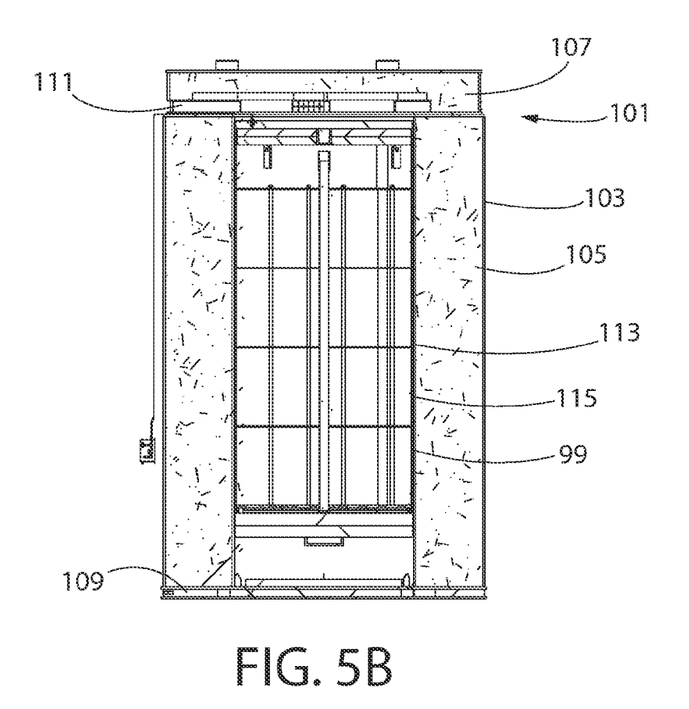
FIG. 5B is a cross-sectional view of the ventilated storage system of FIG. 5A along the line V-B.

A ventilated system 101 is shown in FIGS. 5A & 5B. The cask lid 107 of a ventilated cask 103 is shown in FIG. 5A, and a cross section of the ventilated cask 103 is shown in FIG. 5B. As can be seen in FIG. 5B, the ventilated cask 103 includes a cylindrical cask body 105 and a cask lid 107. The cylindrical cask body 105 includes a set of air inlet ducts 109 near its bottom and a set of air outlet ducts 111 near its top. A dual-walled DSC 99 containing decaying spent nuclear fuel stands upright inside the ventilated cask 103, with a small diametrical clearance, in the form an annular gap 113, being formed between an inner surface of the cylindrical cask body 105 of the ventilated cask 103 and the outer surface 115 of the DSC 99. The outer surface 115 of the DSC 99 becomes heated due to the thermal energy being generated by the spent nuclear fuel sealed in the DSC 99. The heat of the outer surface 115 causes the surrounding air column to heat and rise, resulting in a continuous natural convective ventilation action. The cold air entering the air inlet ducts 111 at the bottom of the cylindrical cask body 105 is progressively heated as it rises in the annular gap 113, reaching its maximum value as it exits the cylindrical cask body 105. Different designs of such casks are known and described in greater detail in the prior art, e.g., U.S. patent publication No. 2003/0147486, published Aug. 7, 2003, and WO 2013/115881, published Aug. 8, 2013, the disclosures of which are incorporated herein by reference in their entirety.

Figure 6:
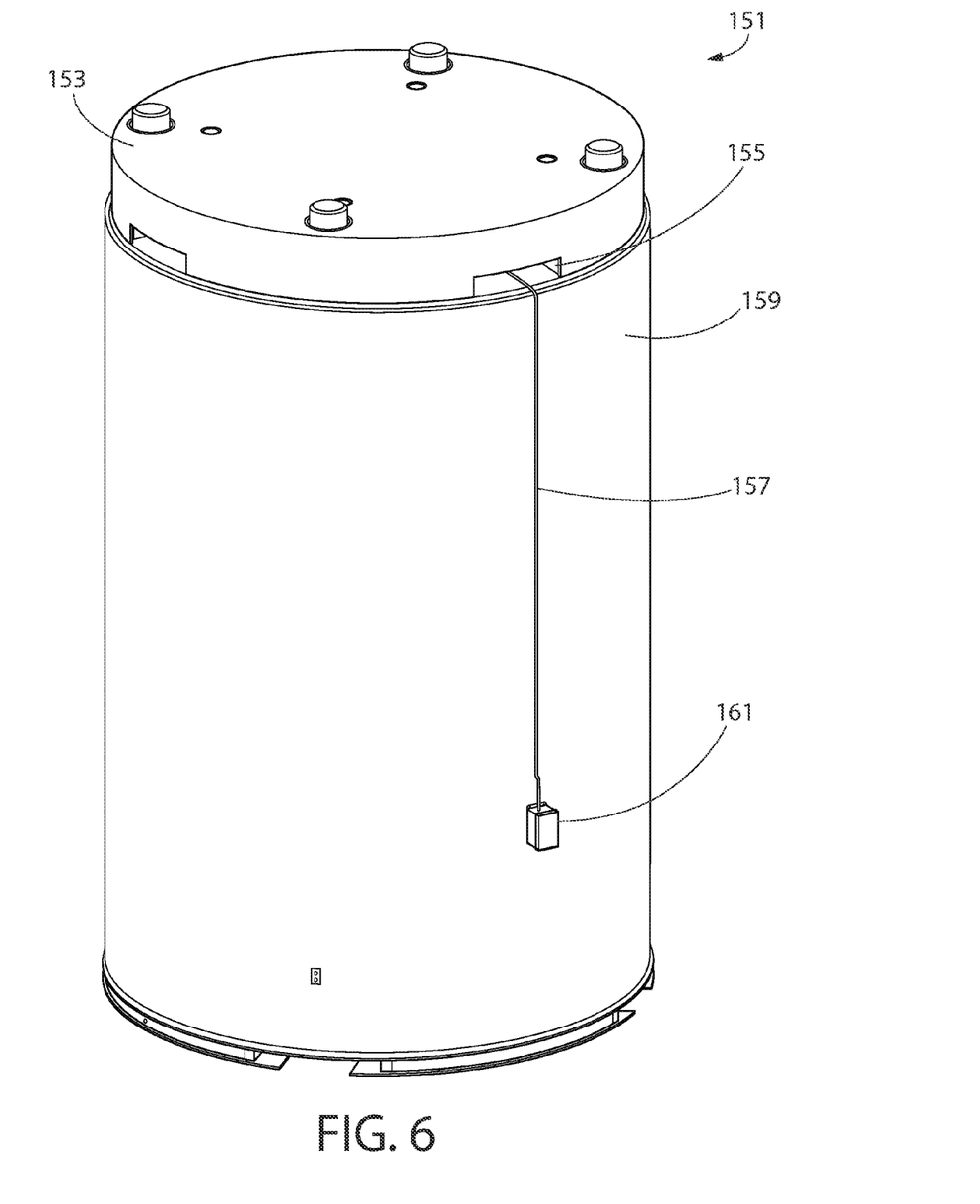
FIG. 6 is a perspective view of a system for storing radioactive materials.

An assembled cask 151 is shown in FIG. 6. The cask lid 153 includes ventilation ducts 155, through one of which the conduit 157 runs to the outside of the cask 151. The conduit 157 extends down the side of the cask body 159, and into an enclosure 161 which is affixed to the exterior of the cask body 159. Although not shown, the conduit may be secured to the cask body 159 by appropriate brackets affixed to the cask body 159. As an alternative, the conduit may extend away from the cask body entirely, to an enclosure that is affixed to an independent support (such as a nearby pole or other wall). The conduit 157 is preferably ¼ inch stainless steel conduit, as such conduit can be evacuated without collapsing. Other conduit materials and sizes that exhibit a similar strength and properties as stainless steel conduit may also be used. Also, the conduit 157 follows a tortuous path from the first end, where it is coupled to the test port, to the second end, to which the seal, valve, and alternately the testing equipment are coupled. The tortuous path is included so that there is no line of sight path for radiation to escape from the DSC to the outside of the cask 151. Also, by running the conduit to the outside of the cask, the testing described below may be performed while the cask remains in its storage position and the cask lid remains on the cask, thereby minimizing the amount of time needed to perform the test and significantly reducing the amount of radiation to which workers are exposed.

Figure 7:
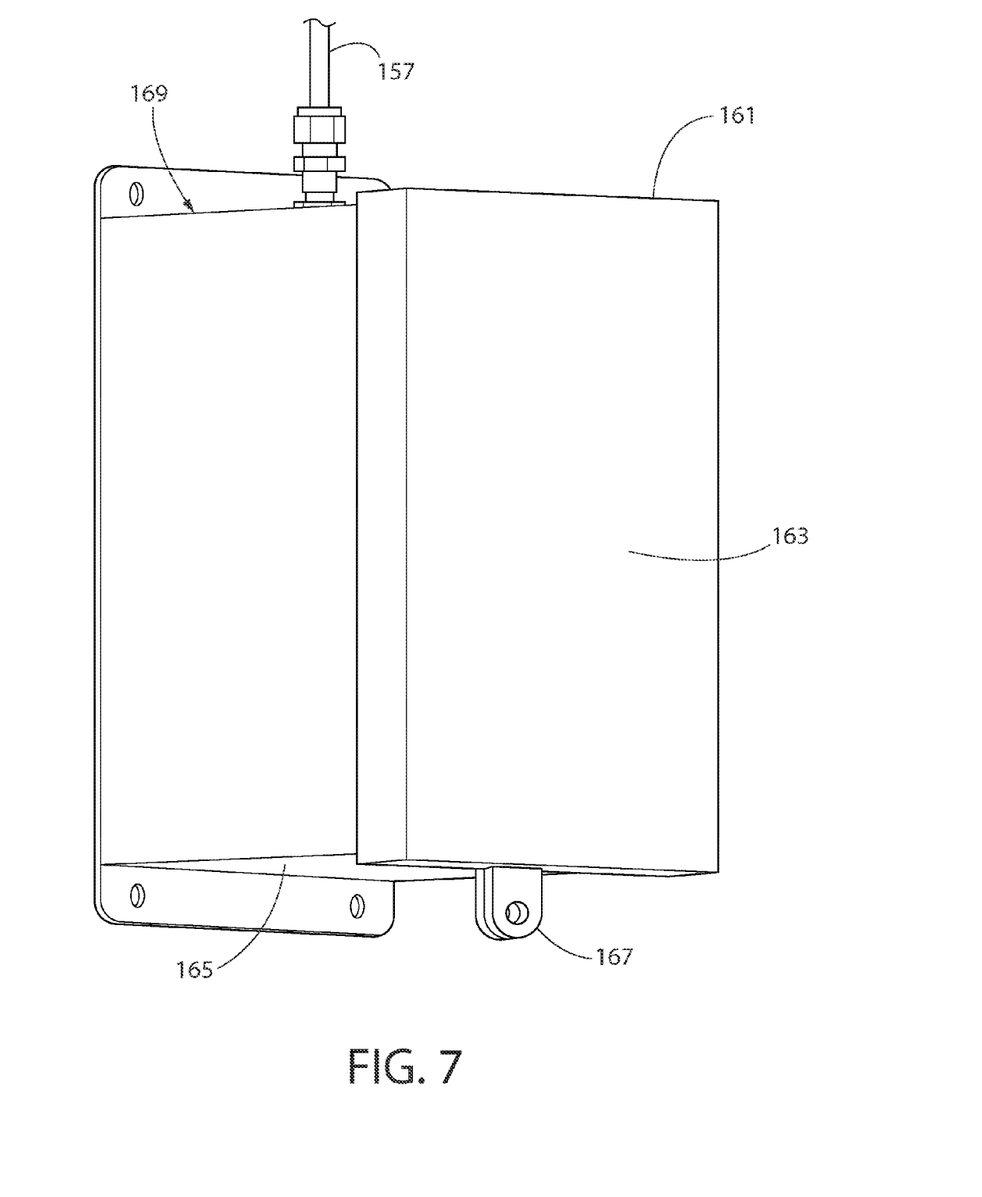
FIG. 7 is a perspective view of an external enclosure for the system of FIG. 6.

FIG. 7 shows a detailed view of the enclosure 161 with a cover 163 in place, which serves to protect contents of the internal chamber of the enclosure 161, and may be used to make the enclosure waterproof, if desired. One sidewall 165 of the enclosure 161 and cover 163 may include features for locking the cover in place—as shown these features are a pair of aligned rings 167 on the sidewall 165 and on the cover 163, which enable a lock or other security feature (e.g., a tag) to be placed on the enclosure 161.

Figure 8:
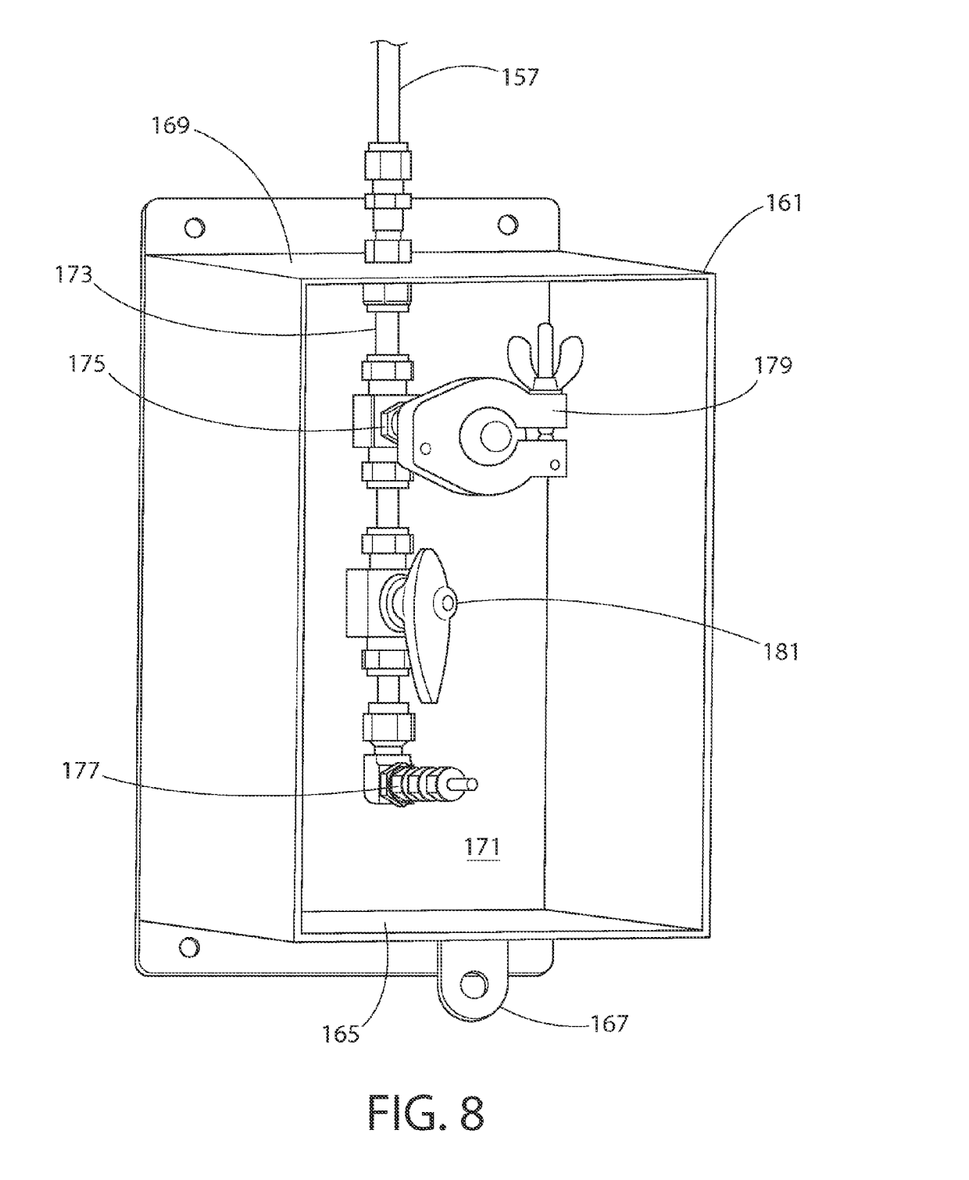
FIG. 8 is a perspective view of the external enclosure without the cover.

The conduit 157 passes through sidewall 169 and into the internal chamber 171 of the enclosure 161, as shown in FIG. 8. Within the enclosure 161, the second end 173 of the conduit 157 includes one test apparatus connector 175 and a secondary connector 177. The two connectors 175, 177 provide a dual failsafe boundary in compliance with ASME Code. When no test is being performed, a removable seal 179 is coupled to the test apparatus connector 175. The removable seal 179 may be of any type suitable for sealing the test apparatus connector 175 and for use under the operating conditions described herein. The test apparatus connector 175 is otherwise configured for coupling to the test apparatus to be used, which may be a mass spectrometer leak detector (MSLD) of the kind which are readily available on the market today, and one of ordinary skill in the art would be aware of the types of different MSLDs available. The secondary connector 177 is regulated by a valve 181 which is suitable for the operating conditions described herein. During the testing process, once tests are performed by the MSLD, a source of a second inert gas (different from the inert gas which is filled in the canister) may be connected to the secondary connector so that the conduit and at least part of the interstitial space are backfilled with this second inert gas.

Figure 9:
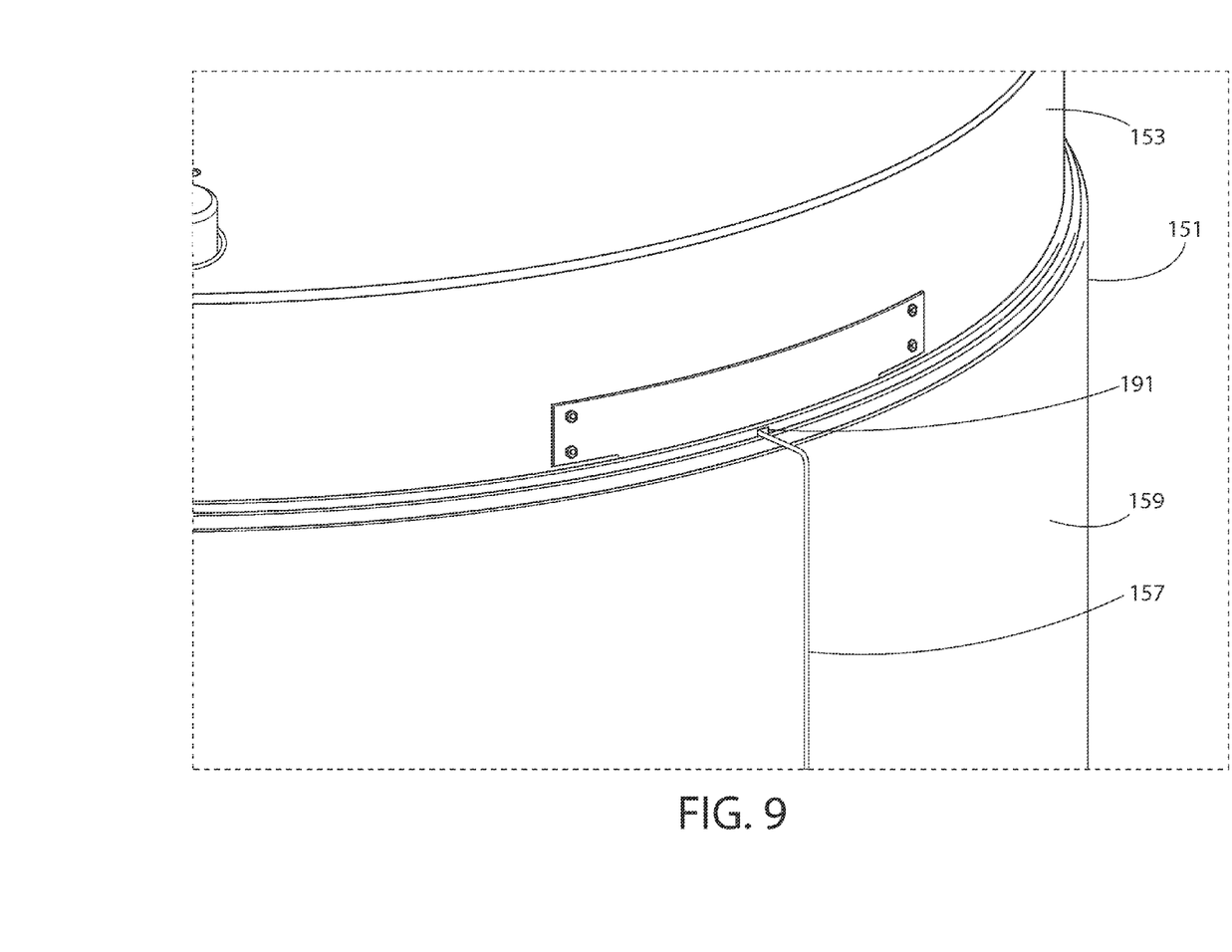
FIG. 9 is a detailed perspective view of a top portion of a ventilated storage system.
Figure 10:
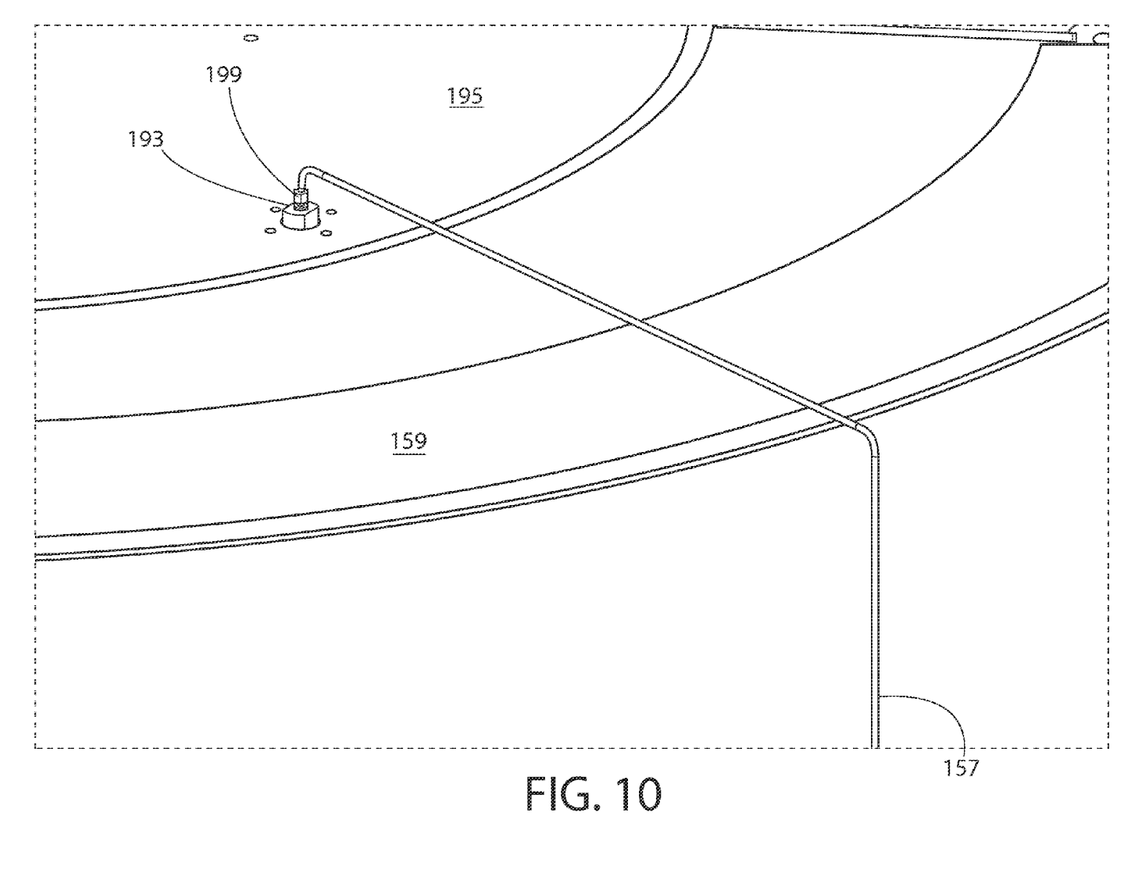
FIG. 10 is a detailed perspective view of a top portion of a ventilated storage system without the cask lid.

An alternative for extending the conduit 157 to the outside of the cask 151 is shown in FIG. 9. In this embodiment, a groove 191 is formed in the cask lid 153, and the conduit 157 is positioned in the groove 191, with the cask lid 153 in place on the cask body 159 so that the conduit 157 may extend to the outside of the cask 151. FIG. 10 shows this same embodiment without the cask lid in place. As shown, the conduit 157 extends across the top of the cask body 159 from the test port 193 formed in the outer top lid 195 of the second pressure vessel. The conduit 157 is coupled to the test port 193 with an appropriate pressure fitting 199, which may also be constructed from stainless steel.

Figure 11:
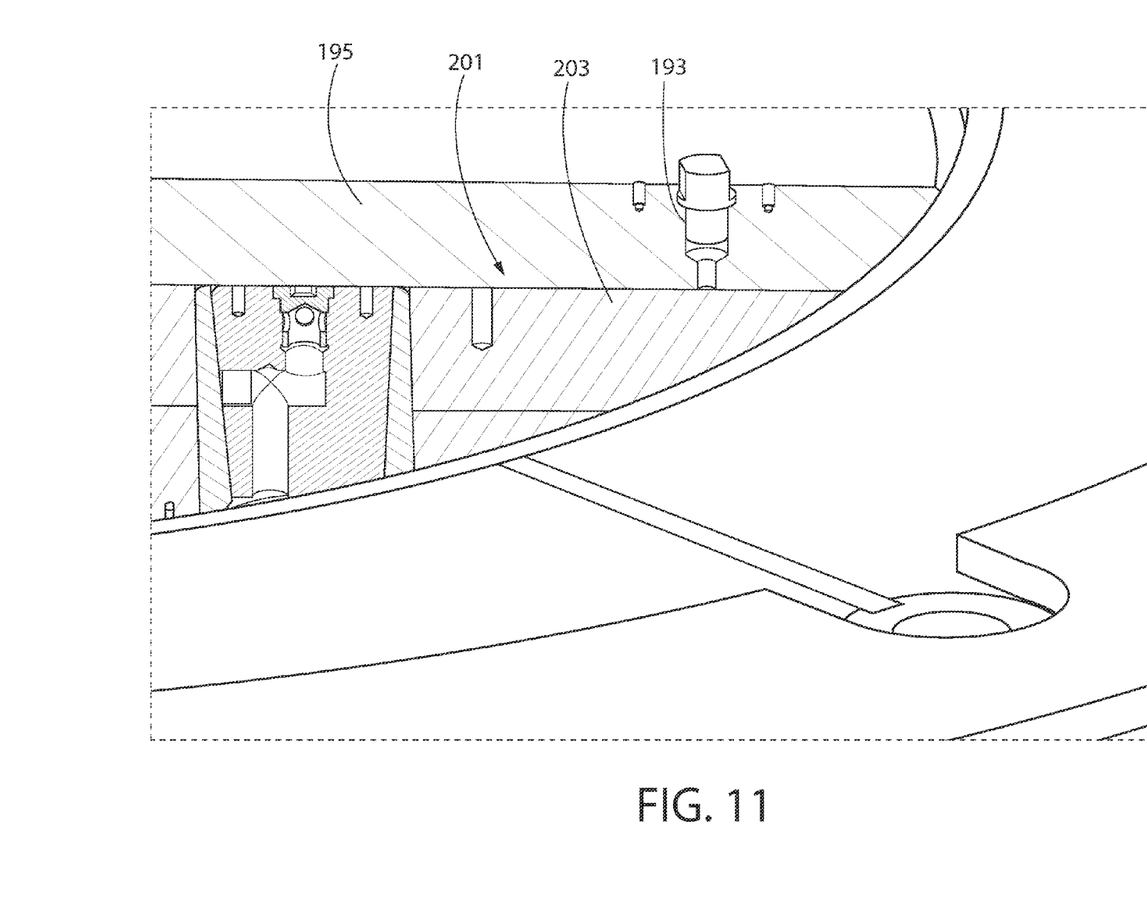
FIG. 11 is a partial cross-sectional view of a ventilated storage system showing the test port.
Figure 12:
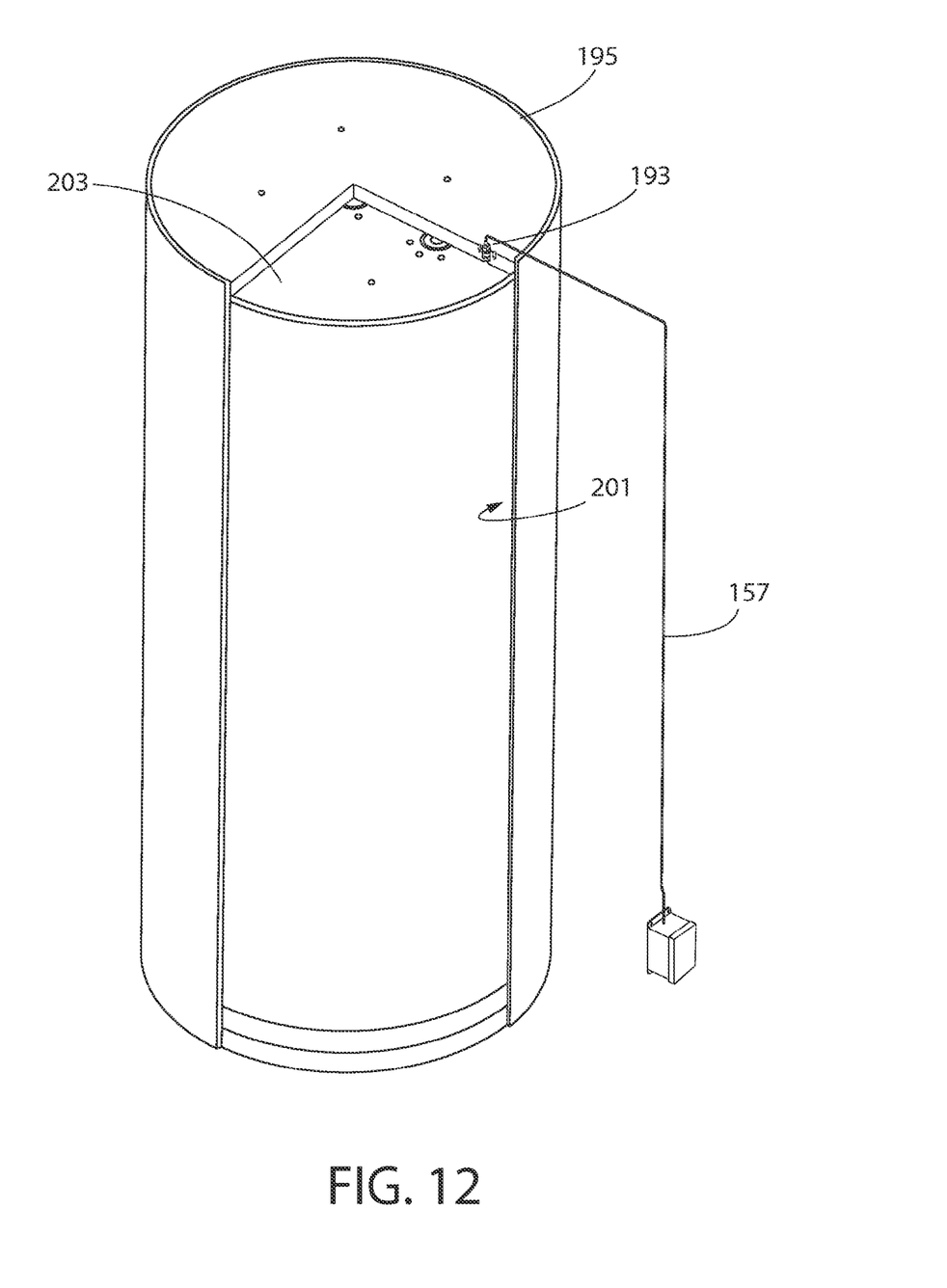
FIG. 12 is a partial cross-sectional view of two pressure vessels used for storing radioactive materials.

FIGS. 11 and 12 illustrate the test port 193 in greater detail—in FIG. 12, the cask is not shown for additional clarity. A portion of the interstitial space 201 exists between the inner top lid 203 and the outer top lid 195. As indicated above, although the interstitial space 201 may be very small, in such a small space, small, inert helium atoms may still move around within such a space. In the event that larger inert atoms are used to fill the cavity of the canister, the choices of how to form the interstitial space may be more limited to take into consideration the presently disclosed system and method of leak detection. The test port 193 extends through the outer top lid 195 so that it is in fluidic communication with the interstitial space 201. Thus, when the vacuum is created in the conduit, if helium molecules are present within the interstitial space, at least some of them will be drawn into the conduit, and from there into the attached MSLD, so that they may be detected.

Figure 13:
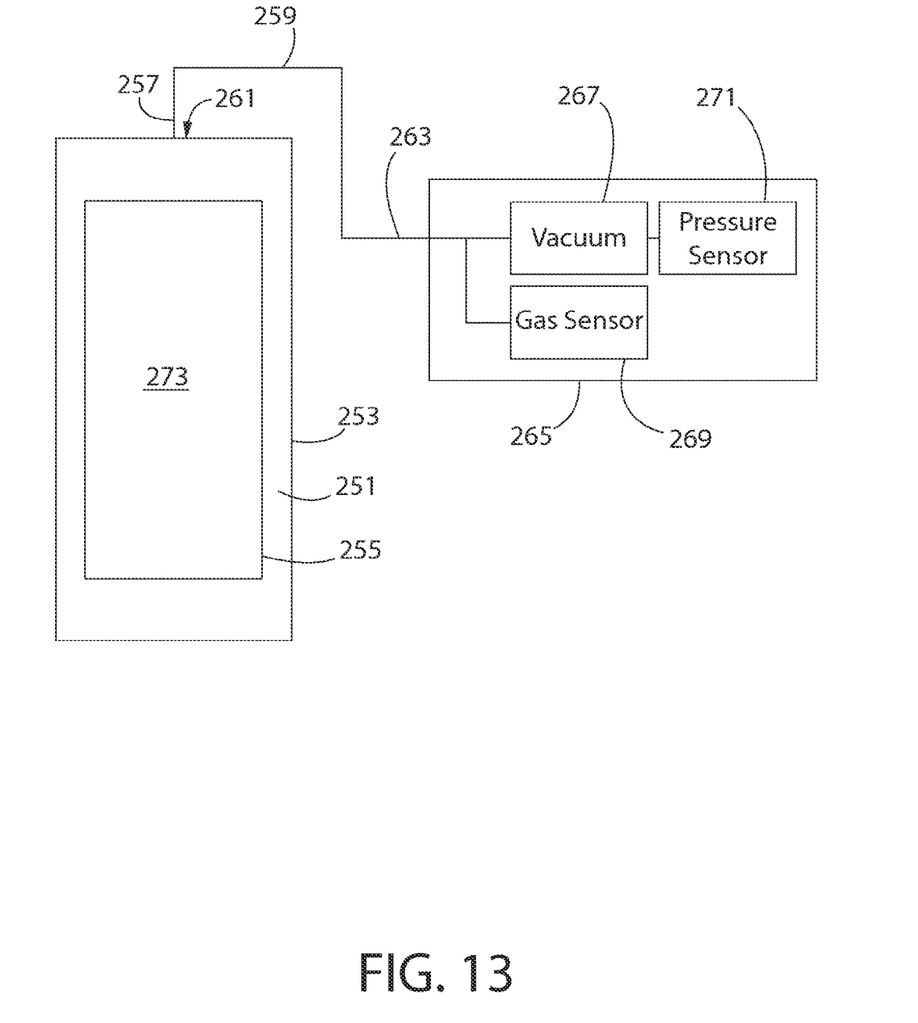
FIG. 13 is a schematic view of a radioactive waste storage system.

A block diagram showing the leak detection system and illustrating the method for detecting leaks is depicted in FIG. 13. The interstitial space 251 is formed between the inner pressure vessel 253 and the outer pressure vessel 255. The first end 257 of the conduit 259 is coupled to the test port 261, and the second end 263 of the conduit 259 is coupled to the leak detector 265, so that the interstitial space 251, the test port 261, the conduit 259, and the leak detector 265 are all in fluidic communication. The leak detector 265 includes a vacuum system 267, which is used to draw gas from the conduit 259, and thus also from the interstitial space 251, into the leak detector 265 for analysis. The leak detector also includes a gas sensor 269, which is preferably a mass spectrometer, and a pressure sensor 271 to monitor the state of the vacuum established in the conduit 259. The gas sensor 269 is configured to detect the presence of the inert gas backfilled into the cavity 273 of the inner pressure vessel 253.

During operation of the leak detector 265, in one embodiment, the mass spectrometer of an MSLD is used to analyze the gas being drawn from the interstitial space while the vacuum is being established. An analysis is performed to determine if the gas being drawn contains helium atoms, and the number of helium atoms are counted. Depending upon the conditions existing at the time of testing, once the count of helium atoms passes a predetermined number, then a leak in the fluidic containment boundary that is formed by the inner pressure vessel may be said to exist. This predetermined number may vary, depending upon the particular storage container, conditions at the time the storage container was manufactured, or the conditions existing at the storage site. In other words, the presence of a single helium atom is not necessarily indicative of a leak in the inner storage container. However, a count of several helium atoms may be indicative of a leak. Further, because of the ease of the testing procedures, a particular canister might be tested two or more times to confirm the presence of excess helium in the interstitial space before a leak is determined to be positively identified.

Also during operation of the leak detector 265, in one embodiment, the pressure sensor of the MSLD is used to monitor the established vacuum in the conduit and in the interstitial space. In the event that the vacuum decreases over a short period of time from its initially established level, or alternatively if the MSLD needs to perform additional work to maintain the vacuum once established, then a leak in the fluidic containment boundary that is formed by the outer pressure vessel may be said to exist. In one embodiment, an MSLD is able to establish a vacuum in the conduit and in the interstitial space at about $10^{-8}$ atms, and if that established vacuum changes by about an order of magnitude, to about $10^{-7}$ atms within a time period of about 1 second, then this is an indicator that there is a breach in the containment provided by the outer pressure vessel.

Once a test is complete, and whether or not a potential or actual leak is identified, the MSLD is decoupled from the conduit, and the removable seal may be put back in place on the test apparatus connector. Alternatively, before the removable seal is put back in place, the conduit may be backfilled with an inert gas that is different from the inert gas used to backfill the cavity of the inner pressure vessel.

The two tests performed by the leak tester are very accurate, and unlike current testing systems, they do not require further investigation to determine if the test resulted in a false positive identification of a leak.

The simplicity of the leak testing system and processes described above enables testing of radioactive materials containment on a regular basis, such as monthly, semi-annually, annually, or at any other chosen interval, without requiring dedicated (and costly) test equipment being connected to every individual containment system. Although dedicated equipment permits constant monitoring, it has been found that intermittent testing is sufficient and more cost effective. In addition, testing a single radioactive materials canister may be performed quickly, meaning that a reduction in manpower may be realized by implementing such systems and methods. Finally, the additional equipment that is added to a canister for performing these leak tests is not complex and requires little maintenance, thereby enabling further cost savings to be realized.

While the invention has been described with respect to specific examples including presently preferred modes of carrying out the invention, those skilled in the art will appreciate that there are numerous variations and permutations of the above described systems and techniques. It is to be understood that other embodiments may be utilized and structural and functional modifications may be made without departing from the scope of the present invention. Thus, the spirit and scope of the invention should be construed broadly as set forth in the appended claims.

What is claimed is:

1. A method of leak testing a storage canister for radioactive materials, the method comprising:

a) positioning the canister in a cask cavity of a cask body, the canister comprising a first hermetically sealed vessel defining a first shell having a first cavity in which the radioactive materials are disposed and a second hermetically sealed vessel defining a second shell having a second cavity, the first vessel having a first lid enclosing the first cavity and the second vessel having a second lid enclosing the second cavity, the first vessel positioned in the second cavity such that an interstitial space exists between the first and second vessels comprising a first portion between the first and second shells and a second portion between the first and second lids, and wherein the second vessel includes a test port that is in fluidic communication with the second portion of the interstitial space between the first and second lids;

b) coupling a first end of a conduit to the test port, the conduit extending from the first end to a second end located outside of the cask body;

c) securing a cask lid to the cask body to substantially enclose the cask cavity; and d) sealingly coupling a leak detector to the second end of the conduit, the leak detector configured to draw gas from the conduit and the interstitial space and to perform a leak test comprising determining whether a leak exists in at least one of the first vessel and the second vessel.

2. The method of claim 1, wherein the leak test comprises determining whether a leak exists in both the first vessel and the second vessel.

3. The method of claim 1, wherein sealingly coupling the leak detector to the second end of the conduit includes establishing a vacuum within the conduit using the leak detector, and detecting a presence of a first inert gas emerging from the space through the conduit.

4. The method of claim 3, wherein the first inert gas is helium.

5. The method of claim 3, wherein establishing the vacuum within the conduit using the leak detector includes monitoring the established vacuum using the leak detector.

6. The method of claim 5, wherein monitoring the established vacuum includes monitoring the established vacuum with the leak detector to determine whether the established vacuum remains at or below a predetermined threshold.

7. The method of claim 1, wherein the conduit extends through a ventilation duct of the cask lid.

8. The method of claim 1, wherein the conduit extends through a groove formed in at least one of a bottom of the cask lid and a top of the cask body.

9. The method of claim 1, wherein the second end of the conduit is located in an enclosure.

10. The method of claim 9, wherein the weather enclosure is affixed to an outer surface of the cask body.

11. The method of claim 1, further comprising operably coupling a valve to the conduit.

12. The method of claim 1, wherein the conduit is a stainless steel conduit.

13. The method of claim 1, wherein the conduit forms a tortuous path between the first end and the second end.

14. The system of claim 1, wherein the interstitial space envelops the first vessel.

15. The method of claim 1, further comprising: e) decoupling the leak detector following performance of the leak test.

16. The method of claim 15, further comprising:
f) backfilling the interstitial space with a second inert gas following decoupling of the leak detector; and
g) coupling a removable seal to the second end of the conduit.

17. The method of claim 1, wherein the cask lid remains secured to the cask body during performance of the leak test.

18. The method of claim 1, wherein the leak detector comprises a mass spectrometer.

19. A method of leak testing a canister containing radioactive materials, the method comprising:
a) positioning the canister in a cask cavity of a cask body, the canister comprising a first hermetically sealed vessel defining a first shell having a first cavity in which the radioactive materials are disposed and a second hermetically sealed vessel defining a second shell having a second cavity, the first vessel having a first lid enclosing the first cavity and the second vessel having a second lid enclosing the second cavity, the first vessel positioned in the second cavity such that an interstitial space exists between the first and second vessels comprising a first portion between the first and second shells and a second portion between the first and second lids, and wherein the second vessel includes a test port that is in fluidic communication with the second portion of the interstitial space between the first and second lids;

b) coupling a first end of a conduit to a test port of the canister that is in fluid communication with the second portion of the interstitial space between the first and second lids of the canister, the conduit extending from the first end to a second end;

c) sealingly coupling a leak detector to the second end;

d) drawing gas from the conduit using the leak detector to establish a vacuum within the conduit and the interstitial space; and e)d) monitoring the drawn gas for the presence of a first indicator which is representative of a leak in a fluidic containment boundary of the canister that contains the radioactive materials.

20. The method of claim 19, wherein the first indicator is a first inert gas, wherein the canister comprises a first cavity in which the radioactive materials are disposed, the first cavity backfilled with the first inert gas.

21. The method of claim 20, wherein the inert gas is helium.

22. The method of claim 19, wherein step d) further comprises monitoring the drawn gas to determine whether the first indicator is present at or above a predetermined threshold.

23. The method of any of claim 19, further comprising e) monitoring the established vacuum for the presence of a second indicator which is representative of a leak in a fluidic containment boundary of the canister that contains the radioactive materials.

24. The method of any of claim 23, wherein step e) further comprises monitoring the established vacuum to determine whether the second indicator is present at or below a predetermined threshold.

25. The method of claim 19, further comprising: f) decoupling the leak detector following performance of the leak test.

26. The method of claim 25, further comprising:
g) backfilling the interstitial space with a second inert gas following decoupling of the leak detector; and
h) coupling a removable seal to the second end of the conduit.

27. The method of claim 19, wherein the leak detector comprises a mass spectrometer.

* * * * *